US008922840B2

(12) United States Patent
Ito (10) Patent No.: US 8,922,840 B2
(45) Date of Patent: Dec. 30, 2014

(54) IMAGE PROCESSING APPARATUS (71) Applicant: Sakae Ito, Kitanagoya (JP)

(72) Inventor: Sakae Ito, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/949,328

(22) Filed: Jul. 24, 2013

(65) Prior Publication Data
US 2014/0029063 A1 Jan. 30, 2014

(30) Foreign Application Priority Data

Jul. 24, 2012 (JP) ................................. 2012-163684

(51) Int. Cl.
H04N 1/04 (2006.01)
H04N 1/00 (2006.01)
B41J 29/13 (2006.01)

(52) U.S. Cl.
CPC ............ *H04N 1/00543* (2013.01); *B41J 29/13* (2013.01)
USPC ............ 358/296; 358/474; 358/496; 358/497

(58) Field of Classification Search
USPC .................................. 358/296, 474, 496, 497
See application file for complete search history.

(56) References Cited

U.S. PATENT DOCUMENTS

| 6,144,398 A | 11/2000 | Yokoyama et al. |
| 8,472,843 B2 | 6/2013 | Ueda |
| 2010/0141977 A1 | 6/2010 | Ueda |
| 2011/0242626 A1* | 10/2011 | Nagashima ................... 358/498 |
| 2011/0299139 A1 | 12/2011 | Ikebata |

FOREIGN PATENT DOCUMENTS

| JP | 3420486 B2 | 6/2003 |
| JP | 2005-258025 A | 9/2005 |
| JP | 2010-136051 A | 6/2010 |
| JP | 2011-253039 A | 12/2011 |

* cited by examiner

Primary Examiner — Houshang Safaipour
(74) Attorney, Agent, or Firm — Banner & Witcoff, Ltd.

(57) ABSTRACT

An image processing apparatus, comprising a main body and a movable unit configured to be swingable about a first axis located on a rear side and to move between a first placement position and a first separated position, wherein the main body comprises: side frames; an image processing unit; and a body cover comprising side covers and an upper opening, and wherein: each of the side frames has a flat surface part having a height in a first state on a front side; and each of the side covers has a first part having a height in the first state on the front side, a second part in a second state higher than the first state on a rear side near the first axis, and a third part formed to connect the first part with the second part while changing the height thereof.

14 Claims, 9 Drawing Sheets

IMAGE PROCESSING APPARATUS

CROSS-REFERENCE TO RELATED APPLICATION

This application claims priority under 35 U.S.C. §119 from Japanese Patent Application No. 2012-163684, filed on Jul. 24, 2012. The entire subject matter of the application is incorporated herein by reference.

BACKGROUND

1. Technical Field

Aspects of the present invention relate to an image processing apparatus.

2. Related Art

An image processing apparatus configured to have a printer unit (an example of a main body) and a reading unit (an example of a movable unit) provided to be able to swing about a first swing axis provided on the rear side of the printer unit has been provided. Specifically, the reading unit is movable between a first placement position where the reading unit is placed on the printer unit and a first separated position where the reading unit is separated from the printer unit.

The printer unit has a pair of side frames, an image formation unit (as an example of an image processing unit) and a body cover. Each of the side frames forms a surface intersecting with the first swing axis. The image formation unit is supported by the pair of side frames, and performs image formation on a sheet-like medium. The body cover includes a pair of side covers externally covering the pair of side frames. The body cover is formed to have an upper opening through which the image formation unit is exposed to the upper side, by opening a maintenance cover, when the reading unit is at the first separated position.

In order to conduct maintenance work for the image formation unit, it is necessary to swing the reading unit about the first swing axis to the first separated position and to open the maintenance cover. As a result, the upper opening of the body cover is opened, the image formation unit is exposed, and thereby it becomes possible to conduct work for replacing replacements, such as cartridges, or for resolving jamming in the image formation unit.

SUMMARY

Incidentally, regarding image processing apparatuses of the above described conventional type, improvement of performance is progressing. Therefore, the size and the number replacements accommodated in a main body are also increasing. In addition, there is a demand for speeding up work for resolving jamming.

However, if the size of the upper opening is simply increased to solve the above described problem, foreign substances may easily enter a portion near the first swing axis, and thereby swinging motion of the movable unit with respect to the main body may be badly affected. Furthermore, even when the size of the body cover is increased, a certain degree of strength of the whole image processing apparatus needs to be secured. In addition, there is a demand for downsizing the image processing apparatus.

Aspects of the present invention are advantageous in that they provide an image processing apparatus capable of making it easier to conduct maintenance work for an image processing unit and capable of realizing securing of the strength and downsizing of the whole image processing apparatus while securing suitable swinging motion of a movable unit with respect to a main body.

According to an aspect of the invention, there is provided an image processing apparatus, comprising: a main body; and a movable unit configured to be swingable about a first axis located on a rear side of the main body, and configured to be movable between a first placement position where the movable unit is positioned on the main body and a first separated position where the movable unit is separated from the main body. The main body comprises: a pair of side frames forming planes intersecting with the first axis; an image processing unit supported by the pair of side frames, the image processing unit being configured to perform image processing; and a body cover comprising a pair of side covers externally covering the pair of side frames, the body cover being formed to have an upper opening through which the image processing unit is exposed upward when the movable unit is at the first separated position. In this configuration, each of the pair of side frames has a flat surface part on a front side on an upper edge thereof away from the first axis, the flat surface part has a height in a first state, upper edges of the pair of side covers form a part of a periphery of the upper opening, and each of the pair of side covers has a first part where a height of the upper edge of the side cover is in the first state on the front side, a second part where the upper edge of the side cover is in a second state of which height is higher than the first state on a rear side near the first axis, and a third part which is located between the first part and the second part and is formed to connect the first part with the second part while changing the height of the upper edge of the side cover.

DETAILED DESCRIPTION

Hereafter, an embodiment according to the invention will be described with reference to the accompanying drawings.

Figure 1:
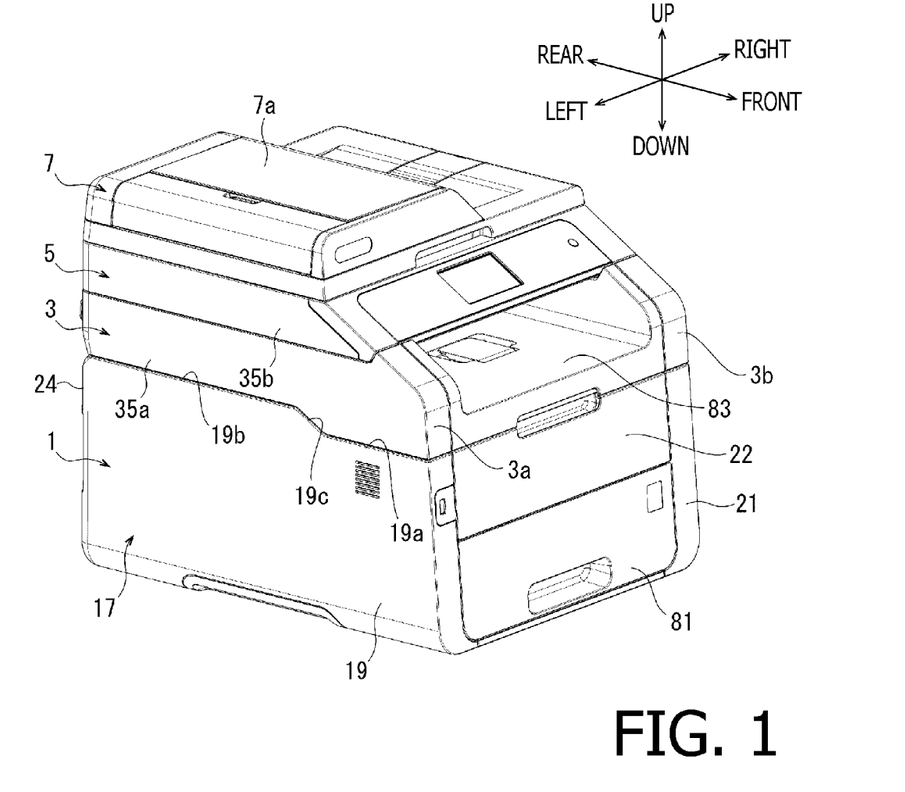
FIG. 1 is a perspective view of an image forming apparatus according to an embodiment, illustrating a state where a joint cover is at a first placement position.
Figure 2:
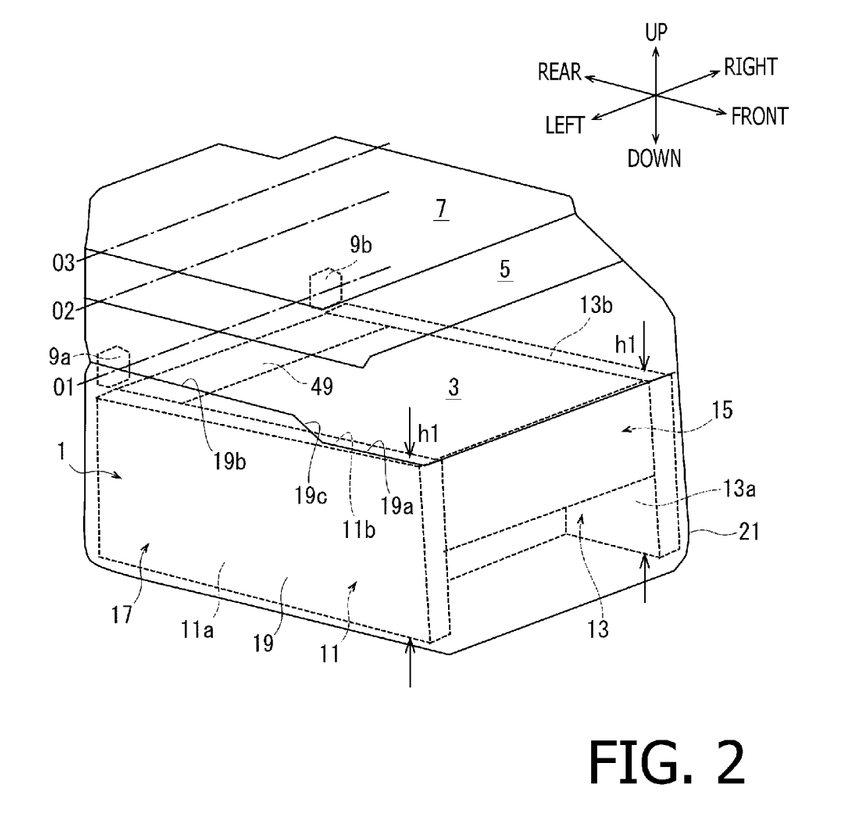
FIG. 2 is a schematic perspective view of the image forming apparatus according to the embodiment, illustrating the state where the joint cover is at the first placement position.

As shown in FIG. 1, an image forming apparatus according to the embodiment is a specific example of an image processing apparatus according to the invention. In FIG. 1, a direction in which a paper supply tray 81 is drawn and an opening side of an output tray 82 are defined as a front side of the image forming apparatus, the left-hand side defined when facing the direction in which the paper supply tray 81 is drawn and the opening side of the output tray 83 is defined as a left side of the image forming apparatus, and the front, rear, left, right, up and down directions are represented accordingly. Directions shown in the drawings from FIG. 2 are defined according to the directions defined in FIG. 1.

(Configuration of Image Forming Apparatus)

As shown in FIG. 1, the image forming apparatus includes a printer unit 1, a joint cover 3 provided above the printer unit 1, a reading device 5 provided above the joint cover 3, and an automatic document feeder 7 provided above the reading device 5.

Figure 5:
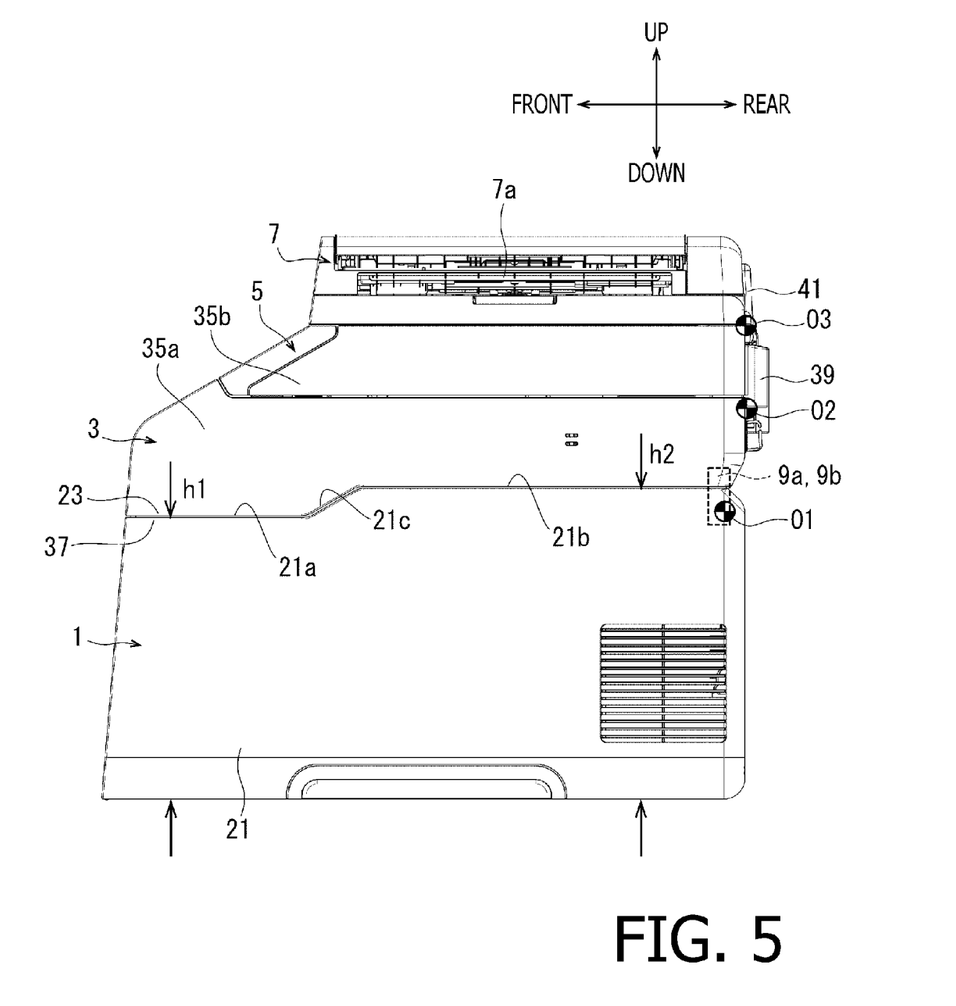
FIG. 5 is a right side view of the image forming apparatus according to the embodiment, illustrating a state where the joint cover is at the first placement position.

Hereafter, configurations of the printer unit 1 and the joint cover 3 will be explained. As shown in FIGS. 2 and 5, between the printer unit 1 and the joint cover 3, a pair of first hinges 9a and 9b which allows the printer unit 1 and the joint cover 3 to swing about a first swing axis O1 is provided. As shown in FIG. 2, the printer unit 1 has a pair of metal side frames 11 and 13 respectively forming surfaces 11a and 13a intersecting with the first swing axis O1. The side frames 11 and 13 have flat surface parts 11b and 13b formed to extend, on upper edges thereof, from a front part away from the first swing axis O1 to a rear part near the first swing axis O1 and to have the same heights so that the flat surface parts 11b and 13b are formed horizontally. The height of each of the flat surface parts 11b and 13b is in a first state h1, has a certain width from the front part to the rear part. An image formation unit 15 which performs image formation on a sheet-like medium is supported on the surfaces 11a and 13a of the pair of side frames 11 and 13. It should be noted that, in this embodiment, the side frames 11 and 13 are arranged to perpendicularly intersect with the first swing axis O1; however, in another embodiment the side frames may be arranged such that an interval defined therebetween gradually increases from the rear side to the front side, or may be arranged such that the interval defined therebetween gradually decreases from the rear side to the front side. The flat surface part of the side frame is not limited to the above described structure, and may be formed to have an uneven part or may be inclined.

Figure 3:
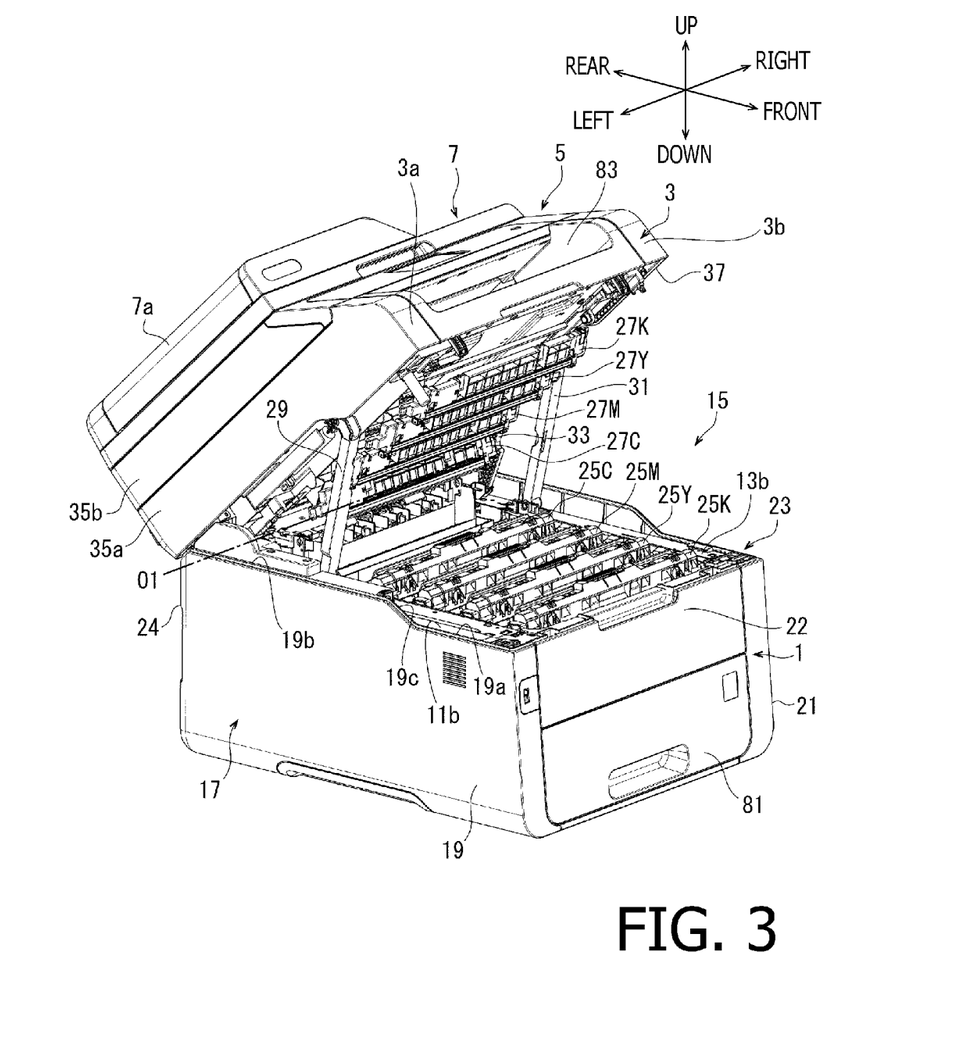
FIG. 3 is a perspective view of the image forming apparatus according to the embodiment, illustrating a state where the joint cover is at a first separated position.

The side frames 11 and 13 are covered with a body cover 17 made of resin. The body cover 17 has a side cover 19 covering the leftward side frame 11, and a side cover 21 covering the rightward side frame 13. As shown in FIG. 1, between the side covers 19 and 21, the paper supply tray 81 is provided such that the paper supply tray 81 can be drawn to the front side. An upper side of the paper supply tray 81 is covered with a front cover 22. The joint cover 3 is arranged to be able to move between a first placement position at which the joint cover 3 is placed on the printer unit 1 as shown in FIGS. 1 and 2 and a first separated position to which the joint cover 3 swings upward about the first swing axis O1 as shown in FIG. 3. An upper opening 23 which lets the image formation unit 15 be exposed to the outside upwardly when the joint cover 3 is at the first separated position is formed in the body cover 17. That is, the upper opening 23 is a space surrounded by the side covers 19 and 21, the front cover 22 and a rear cover 24.

The image formation unit 15 has four cartridges 25K, 25Y, 25M and 25C. The cartridges 25K, 25Y, 25M and 25C are arranged in a portion away from the first swing axis O1 in the printer unit 1. The cartridge 25K corresponds to black, the cartridge 25Y corresponds to yellow, the cartridge 25M corresponds to magenta and the cartridge 25C corresponds to cyan. The cartridges 25K, 25Y, 25M and 25C are arranged in this order along a conveying direction of the sheet-like medium by a conveying belt (not shown) to be parallel with the first swing axis O1. Each of the cartridges 25K, 25Y, 25M and 25C has a photosensitive drum, a development roller and a charger as well as a toner reservoir.

The image formation unit 15 has four LED heads 27K, 27Y, 27M and 27C. Each of the LED heads 27K, 27Y, 27M and 27C is hung from the lower surface of the joint cover 3, and is attached to the joint cover 3 to be able to swing in the front-back direction with respect to an upper end part thereof. The LED head 27K corresponds to black, the LED head 27Y corresponds to yellow, the LED head 27M corresponds to magenta and the LED head 27C corresponds to cyan. The LED heads 27K, 27Y, 27M and 27C are arranged in this order along the conveying direction of the sheet-like medium by the conveying belt (not show) to be parallel with the first swing axis O1.

The image formation unit 15 has a control unit 49 formed of components such as a substrate and wiring. The control unit 49 is arranged in a rear portion near the first swing axis O1, i.e., on the rear side of the upper opening 23. In the printer unit 1, rollers, a conveying belt and guide parts for conveying the sheet-like medium in the paper supply tray 18 to the image formation unit 15 and for ejecting the sheet-like medium to the output tray 83 are also provided. By driving the image formation unit 15 and the conveying part, the control unit 49 forms an image on the sheet-like medium accommodated in the paper supply tray 81.

Figure 4:
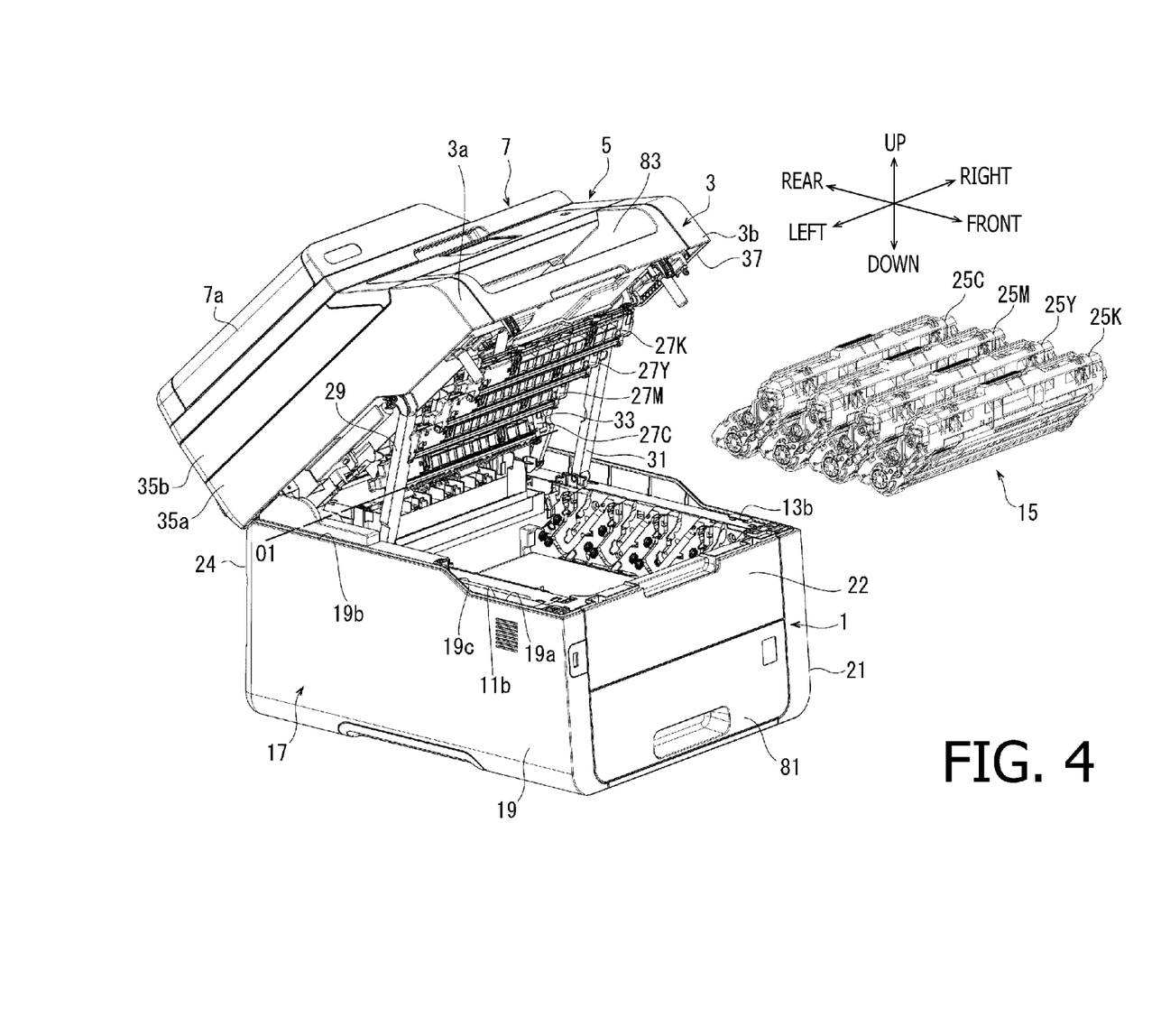
FIG. 4 is a perspective view of the image forming apparatus, illustrating a state where cartridges are removed.

As shown in FIGS. 3 and 4, an upper edge of the side cover 19 forms a left edge of the upper opening 23, and an upper edge of the side cover 21 forms a right edge of the upper opening 23. As shown in FIG. 5, the side cover 21 is formed of a first part 21a having a height in the first state h1 defined from an apparatus installation surface to the upper edge of the guide cover 21 at a front portion away from the first swing axis O1, a second part 21b having a height in a second state h2 which is defined from the apparatus installation surface to the upper edge of the guide cover 21 and is larger than the height in the first state h1, and a third part 21c arranged to connect the first part 21a with the second part 21b while changing the height of the upper edge of the guide cover 21 linearly in a portion between the first part 21a and the second part 21b. Each of the first part 21a and the second part 21b is formed to extend horizontally.

As shown in FIGS. 1 to 4, the side cover 19 is plane symmetrical with respect to the side cover 21. That is, the side cover 19 is formed of a first part 19a where the upper edge thereof has a height in the first state h1, a second part 19b where the upper edge thereof has a height in the second state h2, and a third part 19c formed to connect the first part 19a with the second part 19b.

As shown in FIG. 1, the joint cover 3 has a first housing 35a. The first housing 35a mainly forms an outer covering of the joint cover 3. The first housing 35a has a lower opening 37 which is away from the upper opening 23 of the body cover 17 when the joint cover 3 is at the first separated position as shown in FIGS. 3 and 4, and which communicates with the upper opening 23 when the joint cover 3 is at the first placement position. As shown in FIG. 1, on the upper surface of the first housing 35a, the output tray 83 having an opening on the front side is formed. Specifically, the joint cover 3 has a left support part 3a which supports a left edge of the reading device 5 described later from the lower side, and a right support part 3b which supports a right edge of the reading device 5 from the lower side. A part defined between the left support part 3*a* and the right support part 3*b* is formed to be a recessed flat surface, and serves as the output tray 83 communicating with an ejection opening for the sheet-like medium.

Figure 6:
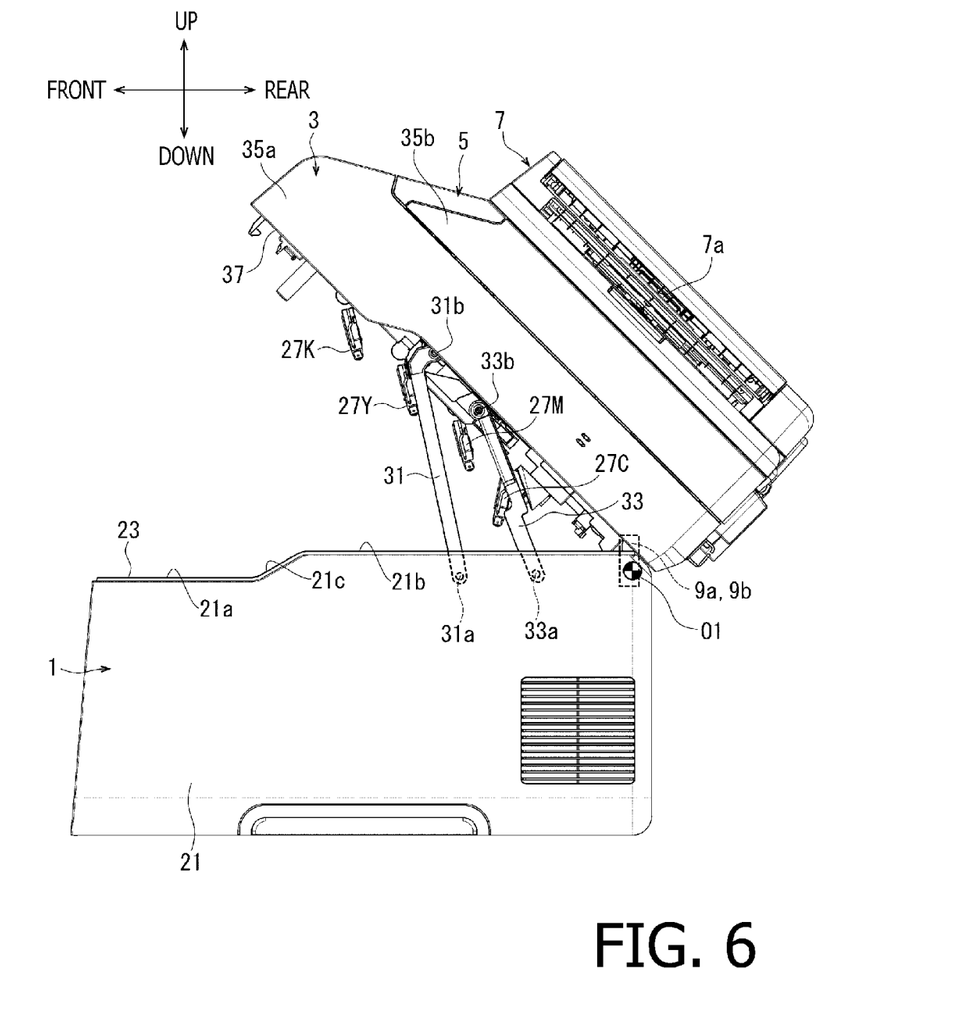
FIG. 6 is a right side view of the image forming apparatus according to the embodiment, illustrating a state where the joint cover is at the first separated position.

As shown in FIGS. 3, 4 and 6, between the printer unit 1 and the joint cover 3, a pair of support arms 29 and 31 and a link arm 33 are provided. The support arms 29 and 31 are configured to support the joint cover 3 when the joint cover 3 is at the first separated position. The link arm 33 is configured to move backward the LED heads 27K, 27Y, 27M and 27C in conjunction with the swinging motion of the joint cover 3 to the first separated position. Since a mechanism for moving backward the LED heads 27K, 27Y, 27M and 27C is known, detailed explanation thereof is omitted.

As shown in FIG. 6, a lower end 31*a* of the support arm 31 is pivotally supported by the printer unit 1, and an upper end 31*b* of the support arm 31 is pivotally supported by the joint cover 3. The height in the second state h2 of the side cover 21 is higher than the height of the lower end 31*a* of the support arm 31. As shown in FIGS. 3 and 4, the support arm 31 is inclined from the upper side to the lower side to approach the first swing axis O1, and the lower end 31*a* is pivotally supported by the printer unit 1 on a first swing axis O1 side with respect to the installation position of the cartridges 25K, 25Y, 25M and 25C. On the other hand, the upper end 31*b* of the support arm 31 is exposed from the lower edge of the first housing 35*a* in the state where the joint cover 3 is at the first separated position. Since the support arm 29 is plane symmetrical with respect to the support arm 31, explanation thereof is omitted.

A lower end 33*a* of the link arm 33 is also pivotally supported by the printer unit 1, and an upper end 33*b* of the link arm 33 is pivotally supported by the joint cover 3. The height in the second state h2 of the side cover 21 is set to be higher than the height of the lower end 33*a* of the link arm 33. As shown in FIGS. 3 and 4, the link arm 33 is inclined form the upper side to the lower side to approach the first swing axis O1, and the lower end 33*a* is pivotally supported by the printer unit 1 on the first swing axis O1 side with respect to the cartridges 25K, 25Y, 25M and 25C. The upper end 33*b* of the link arm 33 is exposed from the lower edge of the first housing 35*a* in the state where the joint cover 3 is at the first separated position.

Figure 7:
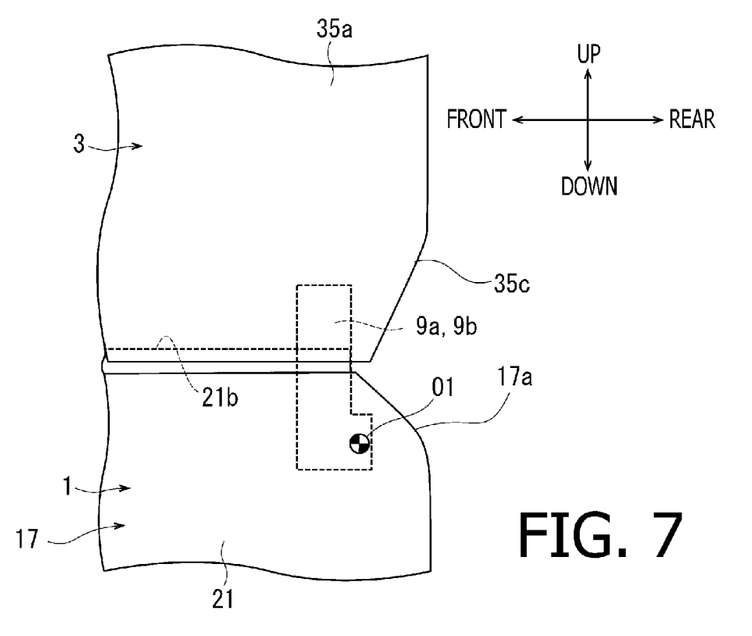
FIG. 7 is an enlarged right side view of the image forming apparatus according to the embodiment, illustrating a state where the joint cover is at the first placement position.
Figure 8:
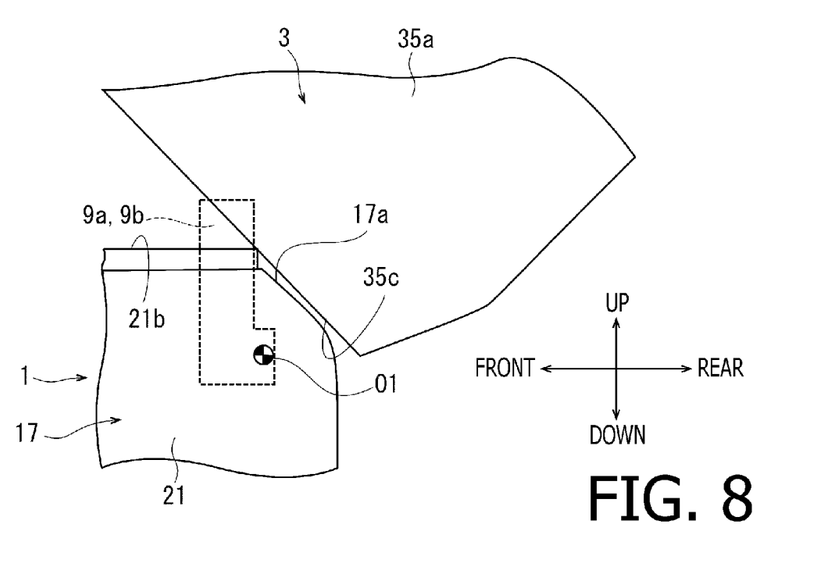
FIG. 8 is an enlarged right side view of the image forming apparatus according to the embodiment, illustrating a state where the joint cover is at the first separated position.

As shown in FIGS. 5 and 6, the joint cover 3 is provided to be able to swing about the first swing axis O1 by first hinges 9*a* and 9*b*. The joint cover 3 is able to move between the first placement position where the joint cover 3 is placed on the printer unit 1 and the first separated position where the joint cover 3 is separated from the printer unit 1. As shown in FIGS. 7 and 8, the first hinges 9*a* and 9*b* are provided inside the side covers 19 and 21. For this reason, a rear upper edge 17*a* of the body cover 17 does not interfere with a rear lower edge 35*c* of the first housing 35*a* of the joint cover 3 even when the joint cover 3 swings to the first separated position. Specifically, a lower part of the rear side of the joint cover 3 is formed to be inclined to the front side as the lower part approaches the printer unit 1. As shown in FIG. 5, the height in the second state h2 of the side covers 19 and 21 is higher than the height of the first swing axis O1 defined by the first hinges 9*a* and 9*b*.

Figure 9:
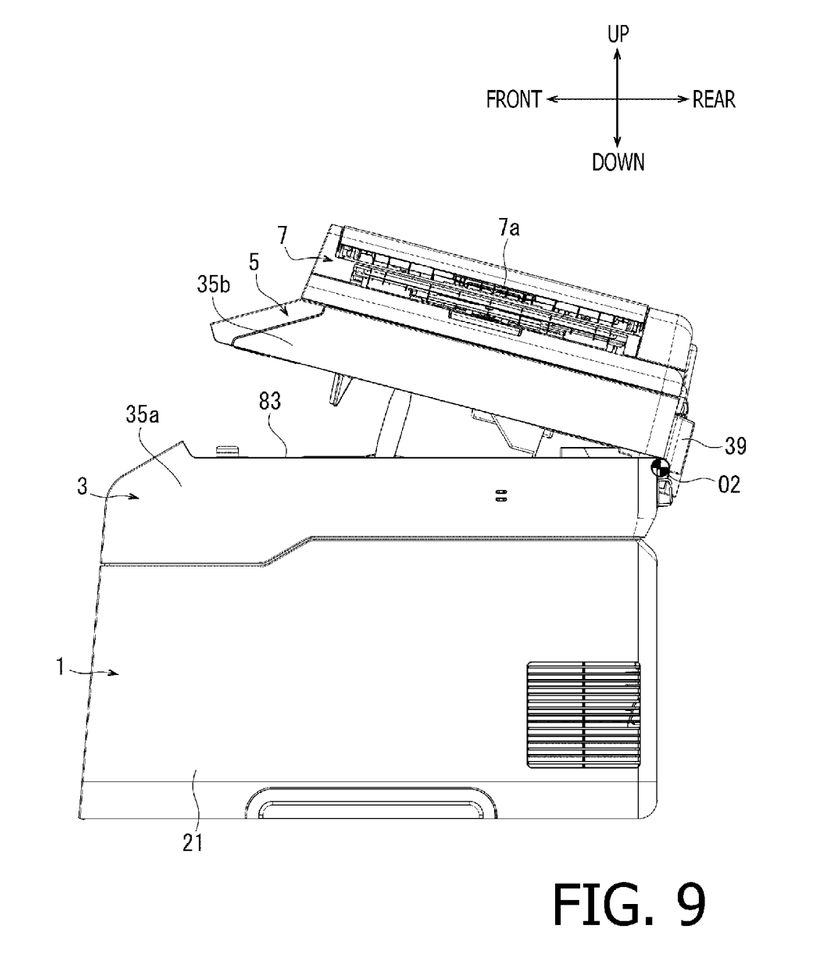
FIG. 9 is a right side view of the image forming apparatus according to the embodiment, illustrating a state where a reading device is at a second separated position.

Hereafter, configurations of the joint cover 3 and the reading device 5 are explained. Between the joint cover 3 and the reading device 5, a pair of second hinges 39 (only one of which is shown) which let the joint cover 3 and the reading device 5 to swing about a second swing axis O2 is provided on the rear side. As shown in FIG. 9, the reading device 5 is able to pivot about the second swing axis O2 by the second hinges 39. The second swing axis O2 is parallel with the first swing axis O1, and is located on the upper rear side of the first swing axis O1. The second hinges 39 are provided outside the first housing 35*a*.

Figure 10:
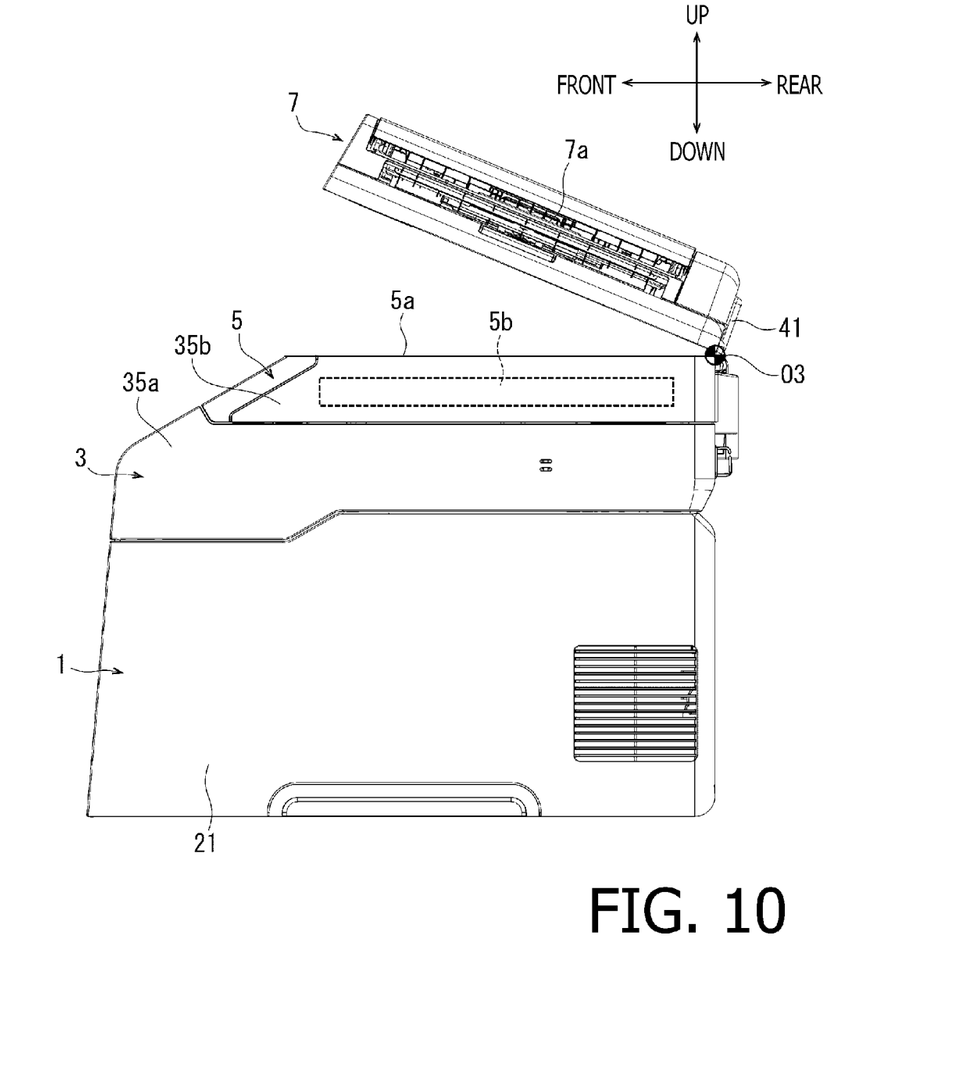
FIG. 10 is a right side view of the image forming apparatus according to the embodiment, illustrating a state where an automatic document feeder is at a third separated position.

The reading device 5 is configured to move between a second placement position where the reading device 5 is placed on the joint cover 3 as shown in FIG. 5 and a second separated position where the reading device 5 is separated from the joint cover 3 as shown in FIG. 9. By setting the reading device 5 to the second separated position, a space defined above the output tray 83 becomes large, and it becomes possible to easily pick up the ejected sheet-like medium. In particular, for a small size sheet-like medium, it is not easy to pick up the sheet-like medium from the front side; however, in this embodiment the sheet-like medium can be easily picked up from the front side by moving the reading device 5 to be separated from the joint cover 3. Furthermore, as shown in FIG. 10, the reading device 5 has a placement surface 5*a* on which a document to be read is placed and a reading unit 5*b* which reads an image of the document on the placement surface 5*a* while moving. The reading unit 5*b* is provided in a second housing 35*b*. Since the reading unit 5*b* has a known configuration, explanation thereof is omitted.

Hereafter, the reading device 5 and the automatic document feeder 7 are explained. As shown in FIG. 5, between the reading device 5 and the automatic document feeder 7, a pair of third hinges 41 (only one of which is shown) which lets the reading device 5 and the automatic document feeder 7 swing about a third swing axis O3 is provided on the rear side of the reading device 5 and the automatic document feeder 7. As shown in FIG. 10, the automatic document feeder 7 is able to swing about the third swing axis O3 by the third hinges 41. The third swing axis O3 is parallel with the first and second swing axes O1 and O2, and is located immediately above the second swing axis O2. The third swing axis O3 is outside the second housing 35*b*.

The automatic document feeder 7 is configured to move between a third placement position where the automatic document feeder 7 is placed on the reading device 5 to cover the placement surface 5*a* as shown in FIG. 5 and a third separated position where the automatic document feeder 7 is separated from the reading device 5 as shown in FIG. 10. The automatic document feeder 7 includes a document feeding unit (not shown) and a conveying unit 7*a* which separates documents placed on the document feeding unit one by one and conveys the document to the reading unit 5*b* located as a stop position. The document being conveyed by the conveying unit 7*a* is subjected to the reading operation by the reading unit 5*b* and is ejected to a document ejection part (not shown).

(Operation of Image Forming Apparatus According to the Embodiment)

In addition to the printing function by the image formation unit 15, the above described image forming apparatus is able to execute the copying function. For example, when the copying function is designated, a document set on the document supply unit of the automatic document feeder 7 is conveyed to the reading unit 5*b* of the reading device 5 by the conveying unit 7*a*, and an image of the document is read by the reading unit 5*b*. Image data read by the reading unit 5*b* is stored in a storage device (not shown) of the control unit 49, and is converted into print data by a controller (not shown) included in the control unit 49. The image formation unit 15 is driven by the control unit 49, the sheet-like medium in the paper supply tray 81 is conveyed, and an image based on the print data is formed on the sheet-like medium. Then, the sheet-like medium on which the image has been formed is ejected to the output tray 83.

When a worker performs maintenance work for the image formation unit 15 of the printer unit 1, the joint cover 3 is swung about the first swing axis O1 to the first separated position as shown in FIG. 3. Thus, the upper opening 23 is opened, and the cartridges 25K, 25Y, 25M and 25C in the printer unit 1 are exposed. In this state, the worker is allowed to conduct work for replacement of the cartridges 25K, 25Y, 25M and 25C or for resolving jamming in the printer unit 1.

In this case, in the image forming apparatus, the first parts 19a and 21a of the side covers 19 and 21 are formed to be lower in the front part away from the first swing axis O1. In addition, the front cover 22 is formed to have the same height as that of the first parts 19a and 21a. Normally, a worker conducts maintenance work from the front side of the image forming apparatus. Therefore, such a configuration makes it possible to easily conduct the maintenance work for the image formation unit 15 because the front portion of the image forming apparatus is formed to be lower than the rear portion. Furthermore, by forming the front cover 22 and the first parts 19a and 21a to be lower, the upper portion of the cartridges 25K, 25Y, 25M and 25C accommodated on the front side in the printer unit 1 can be easily exposed, and the replacement work for the cartridges 25K, 25Y, 25M and 25C can be performed easily. In addition, attachment and detachment work for the cartridges 25K, 25Y, 25M and 25C can be conducted easily.

As shown in FIG. 6, when the joint cover 3 is at the first separated position, the upper ends (31b) of the support arms 29 and 31 and the upper ends 33b of the link arm 33 are exposed from the lower edge of the first housing 35a. Such a configuration enables the worker to conduct the maintenance work while confirming the upper ends (31b, 33b) of the support arms 29 and 31 and the link arm 33. Furthermore, assembling of the image forming apparatus can be easily achieved.

Since the lower ends (31a) of the support arms 29 and 31 are pivotally supported by the printer unit 1 on the first swing axis O1 side with respect to the cartridges 25K, 25Y, 25M and 25C, the cartridges 25K, 25Y, 25M and 25C can be replaced easily.

Since the second parts 19b and 21b of the side covers 19 and 21 are formed to be higher at a rear portion near the first swing axis O1, foreign substances are blocked by the second parts 19b and 21b of the side covers 19 and 21 and thereby the foreign substances are prevented from entering into the inside of the printer unit 1. Therefore, when the joint cover 3 swings about the first swing axis O1 by the first hinges 9a and 9b, it is possible to suitably prevent the swinging motion of the joint cover 3 from being hampered by the foreign substances. Furthermore, since the control unit 49 is arranged on the rear side of the upper opening 23, the control unit 49 cannot be viewed easily from the outside due to existence of the second parts 19b and 21b in the second state h2.

In the image forming apparatus, the reading device 5 is located on the joint cover 3, the automatic document feeder 7 is located on the reading device 5, and the first to third swing axes O1 to O3 are provided to be parallel with each other on the rear side of the image forming apparatus. Therefore, the wiring from the reading device 5 and the automatic document feeder 7 are connected to the control unit 49 via a portion near the first to third swing axes O1 to O3, and the wiring is intricately arranged around the control unit 49. In this regard, since the second parts 19b and 21b are formed to be higher than the position of the control unit 49, the control unit 49 and the wiring around the control unit 49 are hard to view from the outside. As a result, it becomes possible to prevent a user to contact the control unit 49. Since the first hinges 9a and 9b are located in the inside of the side covers 19 and 21, and the height in the second state h2 is higher than the first swing axis O1, it is possible to prevent the foreign substances from entering into the first hinges 9a and 9b. As described above, according to the image forming apparatus, the user is prevented from contacting the control unit 49, and foreign substances are prevented from entering into the portion near the first hinges 9a and 9b. Consequently, durability of the image forming apparatus can be enhanced, and the outer appearance of the image forming apparatus can also be enhanced.

Since the height in the second state h2 of the side covers 19 and 21 is higher than the lower ends (31a) of the support arms 29 and 31 and the lower end 33a of the link arm 33, the lower ends (31a) of the support arms 29 and 31 and the lower end 33a of the link arm 33 are covered with the body cover 17. Therefore, it is possible to prevent foreign substances from entering into the portion near the lower ends (31a) of the support arms 29 and 31 and the lower end 33a of the link arm 33, and excellent durability can be achieved.

In the image forming apparatus, the first parts 19a and 21a of the side covers 19 and 21 and the flat surface parts 11b and 13b of the side frames 11 and 13 have the same height in the first state h1, and the upper edges of the first parts 19a and 21a secure a suitable strength together with the side frames 11 and 13. Therefore, when an external force acts on the first parts 19a and 21a of the side covers 19 and 21 from the upper side, the force is scattered to the side frames 11 and 13, and it is prevented that only the first parts 19a and 21a of the side covers 19 and 21 receive the force. As a result, the first parts 19a and 21a of the side covers 19 and 21 are prevented from being damaged, and thereby the body cover 17 shows excellent durability.

Furthermore, according to the image forming apparatus, the height of the image forming apparatus can be lowered and the image forming apparatus can be downsized, in comparison with the case where the body cover 17 is formed to have the uniform height in conformity with the second state h2.

The third parts 19c and 21c of the side covers 19 and 21 play an intermediate role between the first parts 19a and 21a and the second parts 19b and 21b. In particular, since the third parts 19c and 21c of the side covers 19 and 21 are arranged between the first parts 19a and 21a and the second parts 19b and 21b, and are formed to connect the first parts 19a and 21a with the second parts 19b and 21b, the upper edges of the third parts 19c and 21c are inclined when viewed as a side view. Therefore, when the joint cover 3 is at the first separated position, angular parts are not exposed at the upper edges of the side covers 19 and 21. Therefore, the body cover 17 is hard to be damaged, and excellent durability can be achieved.

Therefore, according to the image forming apparatus, maintenance work for the image formation unit 15 can be performed easily, and it becomes possible to realize securing of the strength and downsizing of the image forming apparatus, while securing excellent swinging motion of the joint cover 3 about the first swing axis O1 with respect to the printer unit 1.

In the above descriptions, the present invention is explained in line with a certain embodiment thereof; however, the present invention is not limited to the above described embodiment, and can be varied without departing from a concept of the invention.

For example, in the above described embodiment, the first parts 19a and 21a and the second parts 19b and 21b of the side covers 19 and 21 have the flat heights. However, the configuration where the first parts 19a and 21a are lower than the second parts 21a and 21b is sufficient, and therefore the first parts 19a and 21a and the second parts 19b and 21b may be formed to be inclined. The structures of the third parts 19c and 21c are not limited to the straight shapes, and may have curved shapes.

Furthermore, in the above described embodiment, the left side cover 19 and the right side cover 21 are symmetric with each other, the first states h1 on the left and right sides are the same, and the second states h2 on the left and right sides are the same. However, the present invention is not limited to such a configuration, and the heights in the first states h1 on the left and right sides may be different and the heights in the second states h2 on the left and right sides may be different. The configuration defined in a range from the first part 19a to the second part 19c of the side cover 19 may be different from the configuration defined in a range from the first part 21a to the second part 21c of the side cover 21.

The first to third swing axes O1 to O3 may not be parallel. The first to third swing axes O1 to O3 may be formed such that the first to third swing axes O1 to O3 intersect with each other. In the above described embodiment, the first to third swing axes O1 to O3 are arranged at the back edge portion of the image forming apparatus as shown in FIG. 5; however, the present invention is not limited to such a configuration. The first to third swing axes O1 to O3 may be arranged in a front portion of the image forming apparatus.

Configuration of the first hinges 9a and 9b are not limited to the above described example where the first hinges 9a and 9b rotate about the first swing axis O1. As long as the joint cover 3 is able to move between the position where the joint cover 3 is placed on the printer unit 1 and the position where the joint cover 3 is separated from the printer unit 1, the first hinges 9a and 9b may be configured such that the hinges rotate while the rotation axis moves or may be configured to have a sliding structure. The same applies to the second hinge 39 and the third hinge 41.

What is claimed is:

1. An image processing apparatus, comprising:
   a main body; and
   a movable unit configured to be swingable about a first axis located on a rear side of the main body, and configured to be movable between a first placement position where the movable unit is positioned on the main body and a first separated position where the movable unit is separated from the main body,
   the main body comprising:
   a pair of side frames forming planes intersecting with the first axis;
   an image processing unit supported by the pair of side frames, the image processing unit being configured to perform image processing; and
   a body cover comprising a pair of side covers externally covering the pair of side frames, the body cover being formed to have an upper opening through which the image processing unit is exposed upward when the movable unit is at the first separated position,
   wherein:
   each of the pair of side frames has a flat surface part on a front side on an upper edge thereof away from the first axis, the flat surface part having a height in a first state;
   upper edges of the pair of side covers form a part of a periphery of the upper opening; and
   each of the pair of side covers has a first part where a height of the upper edge of the side cover is in the first state on the front side, a second part where the upper edge of the side cover is in a second state of which height is higher than the first state on a rear side near the first axis, and a third part which is located between the first part and the second part and is formed to connect the first part with the second part while changing the height of the upper edge of the side cover.

2. The image processing apparatus according to claim 1, wherein the image processing unit comprises:
   a replacement part which needs to be replaced; and
   a control unit which does not need to be replaced,
   wherein the control unit is disposed on a rear side of the upper opening.

3. The image processing apparatus according to claim 2, wherein the replacement part is a cartridge which is detachable from the main body by being pulled out upward.

4. The image processing apparatus according to claim 2, wherein the replacement part is a consumable supply.

5. The image processing apparatus according to claim 1, wherein:
   a first hinge forming the first axis is disposed between the main body and the movable unit;
   the first hinge is arranged inside the pair of side covers; and
   the height in the second state of the pair of side covers is higher than the first axis.

6. The image processing apparatus according to claim 1, wherein:
   an arm is disposed between the main body and the movable unit such that a lower end portion of the arm is pivotally supported by the main body and an upper end portion of the arm is pivotally supported by the movable unit; and
   the height in the second state of the pair of side covers is higher than the lower end portion of the arm.

7. The image processing apparatus according to claim 6, wherein:
   the movable unit comprises an upper housing;
   the upper housing has a lower opening which communicates with the upper opening when the movable unit is at the first placement position; and
   the upper end portion of the arm is exposed from the upper housing when the movable unit is at the first separated position.

8. The image processing apparatus according to claim 6, wherein the arm is a support arm which holds a position of the movable unit when the movable unit is at the first separated position.

9. The image processing apparatus according to claim 8, wherein the image processing unit comprises:
   a replacement part which needs to be replaced; and
   a control unit which does not need to be replaced,
   wherein the lower end portion of the support arm is pivotally supported by the main body on a first axis side with respect to the replacement part.

10. The image processing apparatus according to claim 6, wherein:
    the image processing unit is an image formation unit configured to form an image on a sheet;
    the image formation unit is disposed in the movable unit, and has a plurality of LED heads arranged to be parallel with the first axis; and
    the arm is a link arm configured to move the plurality of LED heads in conjunction with swinging motion of the movable unit.

11. The image processing apparatus according to claim 1, wherein the movable unit comprises:
    a first movable part disposed with a first hinge forming the first axis between the first movable part and the main body;
    a second movable part having a second hinge disposed between the second movable part and the first movable part, the second movable part being configured to be attached to the first movable part to be swingable about a second axis and configured to be movable between a second placement position where the second movable part is positioned on the first movable part and a second separated position where the second movable part is separated from the first movable part; and a third movable part having a third hinge disposed between the third movable part and the second movable part, the third movable part being configured to be attached to the second movable part to be swingable about a third axis and configured to be movable between a third placement position where the third movable part is positioned on the second movable part and a third separated position where the third movable part is separated from the second movable part.

12. The image processing apparatus according to claim 11, wherein the second axis and the third axis are disposed on rear sides of the second movable part and the third movable part, respectively, and are parallel with the first axis.

13. The image processing apparatus according to claim 11, wherein:
an upper surface of the first movable part is configured to serve as an output tray to which a sheet for which image processing has been performed in the image processing unit is ejected;
the second movable part is a reading device having a placement surface on which a document is placed and a reading unit configured to read an image on the sheet placed on the placement surface; and
the third movable part is a cover member configured to cover the placement surface and to open or close the placement surface.

14. The image processing apparatus according to claim 13, wherein the cover member comprises a conveying unit configured to convey the sheet to the reading unit located at a stop position.

* * * * *